Patented Aug. 22, 1933

1,923,179

UNITED STATES PATENT OFFICE 1,923,179

TREATMENT OF TEXTILES AND AGENTS THEREFOR

Heinrich Ulrich and Joseph Nuesslein, Ludwigshafen-on-the-Rhine, Germany, assignors to I. G. Farbenindustrie Aktiengesellschaft, Frankfort-on-the-Main, Germany No Drawing. Application March 16, 1931, Serial No. 523,180, and in Germany March 20, 1930

11 Claims.  (Cl. 8—20)

The present invention relates to the treatment of textiles and of agents therefor.

We have found that the action of non-dyeing baths necessary for the wet treatment of textiles is improved by the addition to the water, or agents to be dissolved therein or to the solutions, of the cyclic ethers obtainable by splitting off water from hydroxy-alkyl amines and known as morpholines which have the general formula:

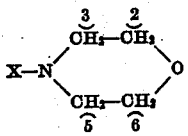

in which X is hydrogen or an alkyl, aryl or cycloalkyl radicle which may also contain a substituent, as for example a hydroxyl or amino group and in which morpholines one or more hydrogen atoms of the nucleus may be substituted for example by alkyl groups. Ethers of the aforesaid nature are for example N-methyl, 2.6-dimethyl or N-hydroxyethyl morpholines, N-phenyl morpholine, N-cyclohexyl morpholine and the like. The said ethers may be employed as such or in the neutralized form i. e. in the form of their salts with inorganic or organic acids, such as hydrochloric, sulphuric, formic or acetic acids or the acids of the animal or vegetable fats or oils and the like. The amount of the ethers used will usually vary between 0.1 and 5 per cent, and preferably between 0.2 and 0.5 per cent, by weight of the bath.

The said ethers as well as their salts are usually readily soluble in water and have in particular the property of promoting the wetting and penetration of textiles by baths of liquids. They also have a good solvent power for many organic substances, such as fats, oils, dyestuffs and the like, and they may therefore be employed with advantage for washing and stripping purposes. For the said purposes, the bases or their salts, as for example their salts with acids of vegetable or animal oils or fats or their synthetic equivalents, are suitable alone or in combination with, for example equal amounts of, dispersing agents, such as soaps, products similar to Turkey red oil, condensation products from amines, or hydroxy-alkyl amines, with fatty acids, such as oleic or stearic acid or sulphonic acids, such as sulphonated palmitic acid, as for example amides, esters or ester-amides, or non-fatty dispersing agents, such as alkylated aromatic sulphonic acids or their salts or with organic solvents, such as benzine or carbon tetrachloride, or with several of these substances. For the sake of brevity, the water and the other substances improving the textiles or assisting the improvement will be referred to in the appended claims as agents capable of improving textiles.

The following examples will further illustrate the nature of this invention, but the invention is not restricted to these examples.

*Example 1*

500 grams of N-hydroxyethyl morpholine,

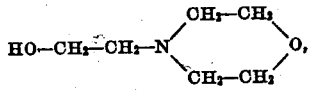

obtained by splitting off water from tri-ethanolamine by means of 70 per cent sulphuric acid at 170° C., are added to 1 cubic metre of a bucking bath containing per liter 3 grams of caustic soda and 2 grams of soda for each 100 kilograms of cotton material. The high solvent power for cotton wax and the high penetrating power of the hydroxy ethyl morpholine assists the bucking process in an excellent manner so that the usual time for boiling may be reduced by about one third to a half.

*Example 2*

5 grams of soap and 5 cubic centimeters of morpholine or 5 cubic centimeters of 2.6-dimethyl morpholine,

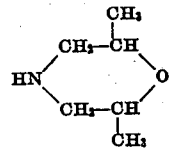

obtainable by splitting off water from di-isopropanol amine by heating for 3 hours to 170° C. in the presence of a 70 per cent aqueous sulphuric acid, are added to each liter of water necessary for scouring 100 kilograms of wool waste containing oil and fat, the temperature of the bath being 40° C. and the material is worked for half an hour, squeezed out and rinsed. An excellent cleansing of the material is obtained. Instead of the said morpholine, the product obtainable therefrom by neutralization with fatty acids, for example 5 grams of the salt with oleic acid, or with palmitic sulphonic acid and which has a very high wetting, emulsifying and washing power may be employed.

Example 3

4 kilograms of 80 per cent formic acid and 2 kilograms of the cyclic ether,

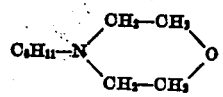

obtained by splitting off water from cyclohexyl di-ethanol amine, and which has preferably been neutralized with oleic acid or with sulphonation products of aliphatic compounds containing at least 8 carbon atoms, such as oleic sulphonic acid, stearic sulphonic acid, Turkey red oil acid or the acid sulphuric ester of cetyl alcohol, are added to the quantity of hot water necessary for stripping (temperature 60° to 70° C.) 100 kilograms of artificial wool waste, the goods are introduced into the bath, 3 kilograms of zinc formaldehyde-sulphoxylate are added, the bath heated to boiling, boiled for 25 minutes and the goods rinsed. By reason of the good solvent power of the ether employed for dyestuffs and their decomposition products, an excellent stripping effect is obtained.

What we claim is:

1. Preparations for the wet treatment of textiles comprising a non-dyeing agent selected from the class consisting of bucking, stripping, cleansing and scouring agents, capable of improving textiles in aqueous baths, and a morpholine having the formula:

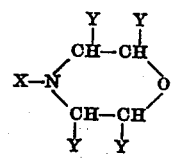

in which X is hydrogen or a substituted or unsubstituted alkyl, aryl or cyclo-alkyl radical and in which Y is hydrogen or an alkyl radical.

2. As new compositions of matter preparations for the wet-treatment of textiles comprising an alkyl morpholine and a non-dyeing agent selected from the class consisting of bucking, stripping, cleansing and scouring agents capable of improving textiles in aqueous baths.

3. As new compositions of matter preparations for the wet-treatment of textiles comprising a hydroxy-alkyl morpholine and a non-dyeing agent selected from the class consisting of bucking, stripping, cleansing and scouring agents capable of improving textiles in aqueous baths.

4. As new compositions of matter preparations for the wet-treatment of textiles comprising a neutralized morpholine and a non-dyeing agent selected from the class consisting of bucking, stripping, cleansing and scouring agents capable of improving textiles in aqueous baths.

5. As new compositions of matter preparations for the wet-treatment of textiles comprising N-hydroxyethyl-morpholine and a non-dyeing agent selected from the class consisting of bucking, stripping, cleansing and scouring agents capable of improving textiles in aqueous baths.

6. As new compositions of matter preparations for the wet-treatment of textiles comprising N-cyclohexyl-morpholine and a non-dyeing agent selected from the class consisting of bucking, stripping, cleansing and scouring agents capable of improving textiles in aqueous baths.

7. As new compositions of matter aqueous baths for the wet-treatment of textiles comprising water and from 0.2 to 0.5 per cent of its weight of a morpholine having the formula:

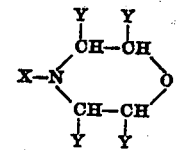

in which X is hydrogen or a substituted or unsubstituted alkyl, aryl or cyclo-alkyl radical and in which Y is hydrogen or an alkyl radical.

8. As new compositions of matter aqueous baths for the wet-treatment of textiles comprising water, and from 0.2 to 0.5 percent of the weight of the bath of a morpholine having the formula:

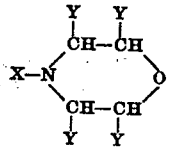

in which X is hydrogen or a substituted or unsubstituted alkyl, aryl or cyclo-alkyl radical and in which Y is hydrogen or an alkyl radical, a non-aqueous, non-dyeing agent selected from the class consisting of bucking, stripping, cleansing and scouring agents capable of improving textiles in aqueous baths.

9. Aqueous baths for the wet treatment of textiles comprising water, a cleansing agent and from 0.2 to 0.5 percent of the weight of the bath of a morpholine having the formula:

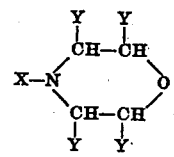

in which X is hydrogen or a substituted or unsubstituted alkyl, aryl or cyclo-alkyl radical and in which Y is hydrogen or an alkyl radical.

10. Aqueous baths for the wet treatment of textiles comprising water, a bucking agent and from 0.2 to 0.5 percent of the weight of the bath of a morpholine having the formula:

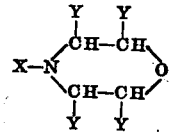

in which X is hydrogen or a substituted or unsubstituted alkyl, aryl or cyclo-alkyl radical and in which Y is hydrogen or an alkyl radical.

11. Aqueous baths for the wet treatment of textiles comprising water, a stripping agent and from 0.2 to 0.5 percent of the weight of the bath of a morpholine having the formula:

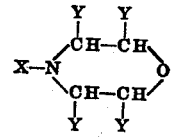

in which X is hydrogen or a substituted or unsubstituted alkyl, aryl or cyclo-alkyl radical and in which Y is hydrogen or an alkyl radical.

HEINRICH ULRICH.
JOSEPH NUESSLEIN.